United States Patent

Ornath (10) Patent No.: US 8,628,609 B2
(45) Date of Patent: Jan. 14, 2014

(54) HYDROGEN STORAGE TANK

(76) Inventor: Fredy Ornath, Tel Aviv (IL)

( * ) Notice: Subject to any disclaimer, the term of this patent is extended or adjusted under 35 U.S.C. 154(b) by 191 days.

(21) Appl. No.: 12/918,815

(22) PCT Filed: Mar. 1, 2009

(86) PCT No.: PCT/IL2009/000234
§ 371 (c)(1),
(2), (4) Date: Aug. 22, 2010

(87) PCT Pub. No.: WO2009/109962
PCT Pub. Date: Sep. 11, 2009

(65) Prior Publication Data
US 2011/0000798 A1 Jan. 6, 2011

Related U.S. Application Data

(63) Continuation of application No. PCT/IL2009/000234, filed on Mar. 1, 2009.

(60) Provisional application No. 61/033,037, filed on Mar. 3, 2008.

(51) Int. Cl.
*F17C 11/00* (2006.01)

(52) U.S. Cl.
USPC .................................. 96/146; 96/154; 206/7

(58) Field of Classification Search
USPC .............. 96/108, 146, 154; 423/648.1, 658.2; 206/0.7; 420/900; 429/515; 502/526
See application file for complete search history.

(56) References Cited

U.S. PATENT DOCUMENTS

| | | | | |
|---|---|---|---|---|
| 3,703,976 A * | 11/1972 | Hughes et al. | ................ | 220/581 |
| 4,507,263 A | 3/1985 | Ron | | |
| 4,799,360 A * | 1/1989 | Retallick et al. | ................ | 62/46.1 |
| 5,536,586 A * | 7/1996 | Tsushio et al. | ................ | 428/649 |
| 5,778,972 A | 7/1998 | Sapru et al. | | |
| 6,432,379 B1 * | 8/2002 | Heung | ................ | 423/648.1 |
| 6,478,844 B1 | 11/2002 | Ovshinsky | | |
| 6,589,312 B1 | 7/2003 | Snow et al. | | |
| 6,626,323 B2 * | 9/2003 | Stetson et al. | ................ | 220/577 |
| 6,672,078 B2 | 1/2004 | Ovshinsky et al. | | |
| 7,060,120 B1 * | 6/2006 | Kanoya et al. | ................ | 75/255 |
| 7,418,782 B2 * | 9/2008 | Kimbara et al. | ................ | 29/890.03 |
| 7,648,567 B2 * | 1/2010 | Chabak | ................ | 96/108 |
| 7,681,753 B2 * | 3/2010 | Yokota et al. | ................ | 220/581 |
| 2006/0101943 A1 * | 5/2006 | Snow et al. | ................ | 75/252 |

(Continued)

FOREIGN PATENT DOCUMENTS

WO 2009/109962 A2 9/2009

OTHER PUBLICATIONS

International Search Report dated Aug. 3, 2009, issued in corresponding International Patent Application No. PCT/IL2009/000234.
International Preliminary Report on Patentability dated Sep. 7, 2010, issued in corresponding International Patent Application No. PCT/IL2009/000234.

(Continued)

*Primary Examiner* — Frank Lawrence, Jr.
(74) *Attorney, Agent, or Firm* — Sughrue Mion, PLLC (57) ABSTRACT

A hydrogen containing tank having an inside wall that is uniquely bonded to a hydride core which is a porous hydrogen containing core material. The high hydrogen content capability and high thermal conductivity properties accommodate rapid release and intake of hydrogen gas. Low temperatures and high hydrogen charging discharging rates help to alleviate the use of hydrogen as an energy source in numerous applications.

21 Claims, 5 Drawing Sheets

(56) References Cited

U.S. PATENT DOCUMENTS

2006/0266219 A1* 11/2006 Ovshinsky et al. ............ 96/108
2007/0151456 A1* 7/2007 Ovshinsky et al. ............ 96/108
2007/0180998 A1* 8/2007 Arnold et al. .................. 96/108
2007/0295617 A1* 12/2007 Zimmermann .................. 206/7

OTHER PUBLICATIONS

Written Opnion of the International Searching Authority dated Aug. 3, 2009, issued in corresponding International Patent Application No. PCT/IL2009/000234.

* cited by examiner

HYDROGEN STORAGE TANK

CROSS-REFERENCE TO RELATED APPLICATIONS

This application is a continuation of International Application No. PCT/IL2009/000234, filed Mar. 1, 2009, which claims the benefit under 35 U.S.C. 119(e) of U.S. Provisional Application No. 61/033,037, filed Mar. 3, 2008.

FIELD OF THE INVENTION

The present invention generally relates to an apparatus for storing hydrogen in non liquefied state.

The present invention particularly relates to a hydrogen storage tank constructed to supply hydrogen safely, quickly as a fuel.

BACKGROUND OF THE INVENTION

Hydrogen is a revolutionary new type of fuel that has emerged quite recently. As a fuel, hydrogen is abundant, affordable, clean and renewable. The only product of hydrogen reaction with oxygen is water that is not polluting. Hydrogen can be produced from renewable sources, and with nil carbon foot print. Hydrogen fuel cells, which produce electrical power form hydrogen, offer several advantages over petroleum-based internal combustion engines, including: water vapor emission, high efficiency, quiet operation, low friction and high energy to weight ratio.

Nonetheless, current production, storage and distribution methods of hydrogen are a significant impediment to the widespread use of hydrogen as an alternative energy source. The most common method of hydrogen distribution involves producing hydrogen gas, liquefying or pressurizing the hydrogen into a pressurized cylinder, shipping the cylinders to the point of use, and releasing the hydrogen from the cylinders. Hydrogen is flammable over a wide range of concentrations in air, and low spark temperatures. Thus, storage, distribution, and use of hydrogen in tanks have to be highly regulated and controlled. Hydrogen tanks are often heavy, contain specialized explosion-proof components, and thus expensive, due to the need to provide the necessary safety measures. Nevertheless, even with these precautions, there is still a significant risk that hydrogen may be released, and explode during loading, unloading, distribution or use, such as accidents and vandalism. Such risks render an unfavorable approach towards powering motorized vehicles with hydrogen.

The predicaments associated with liquid hydrogen, have raised the interest in the use of hydrides as suitable means for storing hydrogen fuel. The term hydride is widely applied to describe compounds of hydrogen with other elements.

The quantity of hydrogen which can be stored per cubic centimeter can be higher in a hydride than in liquid hydrogen.

However, recharging of hydrogen storage device takes generally a long period of time, which can be the order of several hours. Due to this long recharging period, the usefulness of hydrides for hydrogen storage devices has been limited, as has their use in heat engines and non-mechanical compressors and refrigerators, which are even more dependent than storage devices for their utility upon having a very fast heat transfer rate.

The initial activation of hydride-formers by a process of bonding hydrogen atoms with other elements ("hydriding") can take several days, during which the particles crumble into smaller pieces. Nevertheless, the length of time for a subsequent re-hydriding process is more of interest since it specifies the time of charging a hydrogen storage apparatus and out letting the hydrogen from the apparatus. It should be noted that the rate of charging and out letting of the apparatus might be slow unless the heat transfer rate of the apparatus is sufficiently fast. A high heat transfer rate can be provided by using metal compounds for the hydride apparatus. As a metal absorbs hydrogen, it expands and internal stresses cause it to fracture and break apart into smaller pieces ("decrepitation"). The particle size is reduced each absorption and desorption cycle until, eventually, the particles disintegrate into a submicron-sized powder ("fines"). The hydride fines compact conduct heat poorly and do not readily allow hydrogen to permeate. Consequently, hydrogen absorbance deteriorates each successive cycle.

If the powder becomes entrained in the gas stream, it can migrate and contaminate downstream piping and equipment. Even if filters are used to contain the powder, the fine mesh required for such small particles gets easily clogged.

Low absorption and desorption rates can be also caused by limitations due to slow solid state diffusion of the hydrogen in the solid particles, oxide and other coating barriers on the particle surface.

Another problem of hydrogen storage in hydride beds is the volume change of the particles which is associated with absorption and desorption of hydrogen. Since hydrides lose volume up to 20% when releasing hydrogen, the powder tends to collect at the bottom of the container, and when hydrogen is absorbed, the powder expands, and exerts forces on the container, and when this process is repeated many times, damage can be accrued to the container, limiting its life cycle length.

The long time taken to recharge hydride bed containers is mainly due to the limited coefficient of heat conductivity of hydride powders. Since all the processes for absorption and desorption of hydrogen in solids involve certain latent heat that needs to be released (on absorption) or supplied (on desorption), the hydrogen refueling and release depend critically on the heat conductance of the hydride material and its containment system.

Numerous attempts have been made in the art to provide fast and stable hydrides for hydrogen storage and a number of endeavors have been made to alleviate these problems.

U.S. Pat. No. 4,249,654 titled "Hydrogen storage apparatus" discloses a hydrogen storage container, having at least one valved port that is filled to about 75% of capacity with particles of low density material having a hydride forming metal coated on the surface of the particles by vapor or vacuum deposition. The density of the particle is on the order of 5% to 50% of the density of the metal coating thereon. Hydrogen gas is adsorbed into or released from the lattice structure of the hydride forming metal.

The art includes also hydrides that are combined with stable, non-hydridable matrix materials to form compositions that are better able to withstand repeated absorption and desorption cycles than hydrides alone.

U.S. Pat. No. 4,717,629 title "Compact of hydrogen absorption alloy" discloses a compact of hydrogen adsorption alloy principally composed of a metal hydride in which all surfaces of fine particles of hydrogen adsorption alloy are completely coated with a dissimilar metal by plating, without effecting reactivity and a porous material of high thermal conductivity is infiltrated with the fine particles of alloy to be formed into a compact by compression molding.

The poor heat transfer of powdered metal hydrides has been recognized as an impediment for a fast absorption and desorption apparatus. One solution was to form an aggregate constructed as a highly porous metal skeleton with metal hydride consolidated therein.

U.S. Pat. No. 4,607,826 titled "Apparatus for preparing improved porous metal-hydride compacts" discloses a method and apparatus for preparing metal-embedded porous metallic-hydride ("PMH") compacts capable of withstanding repeated hydriding-dehydriding cycles without disintegrating. The finely divided hydridable metal alloy hydride is admixed with a finely divided metal selected from Al, Ni, Cu or other transition metals and charged with hydrogen. The resulting mixture is sintered in a furnace in which hydrogen is introduced at a pressure above the equilibrium pressure to the prevailing temperature, mechanical stress being applied simultaneously. The compacts obtained possess outstanding stability, as shown by the fact that they have remained intact even after more than 6000 cycles.

Numerous hydride compounds, which have substantial stability, absorption and desorption rates, are disclosed in the art. Thus what is needed, and not provided by the art, is a way to integrate those compounds into thermally efficient containers.

SUMMARY OF THE INVENTION

Accordingly, it is a principal object of the invention to disclose a hydrogen containing vessel having a high volume to weight ratio. The inside wall of the vessel is uniquely bonded to a hydride core which is a porous hydrogen containing core ("compact") material with high hydrogen content capability and high thermal conductivity properties to accommodate rapid release and intake of hydrogen gas. Low temperatures and high hydrogen charging and discharging rates help to alleviate the use of hydrogen as an energy source in numerous applications.

In accordance with a preferred embodiment of the present invention, it is the object of the invention to disclose a hydrogen container for storing non liquefied hydrogen comprising: A metallic closed vessel including at least one aperture. The aperture can be sealed or uncovered. A contiguous porous core of hydrogen chemical bonding material. The core is coupled to said vessel inner wall via a bonding layer to accommodate integrity of said core by containing the inside pressure and to enhance thermal conductance from said core to said vessel.

Wherein said hydrogen container provides fast charge and discharge of hydrogen and adequate operation during a plurality of said charge and recharge cycles. Another object of the invention is to disclose a process for producing a metallic hydride porous material usable for a hydrogen storage container, comprising:

Melting a hydride forming metal of a low weight metal as magnesium, alloyed with catalyst under pressurized predominantly hydrogen atmosphere at elevated temperature.

Rapid solidification of the melt such as by spraying molten hydride hydrogen containing metal by letting it out of the melting pot onto a metallic copper spinning wheel or expelling it into a low pressure space that is under high hydrogen content atmosphere.

Cooling rapidly molten hydride to produces solidified hydride material of substantially small grain size.

Comminuting and decrepitating, decreases the hydride grain size under 1 micron.

Another objective of the present invention is to disclose a containment of hydride compacts made from a light metal (such as aluminum and magnesium alloys) matrix composite containing hydride into a casing made from a conducting perforated metal jacket. The metal case is bonded to the said composite through a high conductivity interface such as a lower melting point metallic material. High temperature hydrides can be easily transported without special protection at low temperatures and low external pressure without releasing hydrogen. The hydrogen is released and absorbed only when the pellets are heated at high temperatures in high pressure enclosures. The external metal jacket protects the otherwise brittle compacts during transport and handling and improves heat transfer.

BRIEF DESCRIPTION OF THE DRAWING AND FIGURES

For a better understanding of the invention with regard to embodiments thereof, reference is made to the accompanying drawings, in which the numerals designate corresponding elements and in which.

DESCRIPTION OF THE PREFERRED EMBODIMENTS

The following description is provided, alongside all chapters of the present invention, so as to enable any person skilled in the art to make use of said invention. The description sets forth the best modes contemplated by the inventor of carrying out this invention. Various modifications, however, will remain apparent to those skilled in the art, since the generic principles of the present invention have been defined specifically to provide a hydrogen storage container.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

The drawings set forth the preferred embodiments of the present invention. The embodiments of the invention disclosed herein are the best modes contemplated by the inventors for carrying out their invention in a commercial environment, although it should be understood that various modifications can be made within the scope of the present invention.

The term "hydride" relates hereinafter in a non-limiting manner for all solids in which hydrogen is bound chemically or physically such as by adsorption on surfaces, in addition to the strict chemical bonding. The bond is characterized by the existence of a non-zero bond related latent energy referred to as enthalpy. For example, hydrogen can be stored in solids like carbon nano-tubes, in solid solution, intermetallic compounds, complex ions, or on surfaces such as in zeolites (Tero Hottinen MSc. Thesis,"Technical Review and Economic Aspects of Hydrogen Storage Technologies" Espoo, 2001). Without specific relation to the physical mechanism, a bonding energy is always present.

The present invention discloses a hydrogen containing vessel ("container", "tank", "cylinder", "bottle") having a high volume to weight ratio. The inside wall of the vessel is uniquely bonded to a hydride core which is a porous hydrogen containing core ("compact") material with high hydrogen content capability and high thermal conductivity properties to accommodate rapid release and intake of hydrogen gas. Low temperatures and high hydrogen charging discharging rates help to alleviate the use of hydrogen as an energy source in numerous applications.

Hydrogen containers, whether portable or stationary can be use for numerous applications as hydride based air conditioning and cooling, hydrogen purifications, and for gas delivery in the industry or onboard hydrogen fueled vehicles.

Storage of hydrogen in containers is used for hydride based electrical batteries, devices for purifying hydrogen, heat pumps for cooling and for air conditioning, with improved heat transfer capability, delivery of hydrogen for vehicles as well as for other industrial and laboratory applications and rapid collection and containment of radioactive tritium spill.

Figure 1:
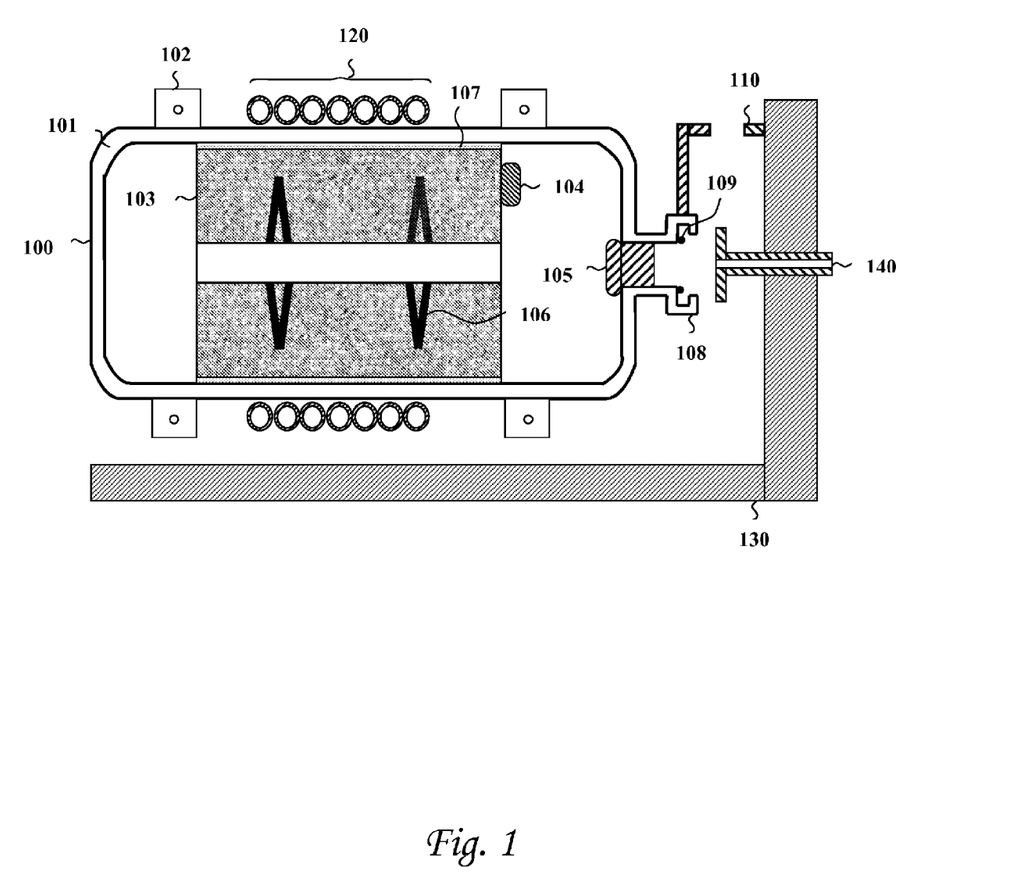
FIG. 1 illustrates a non scaled cross sectional view of a vessel bonded to a porous metal core, adaptable for containing hydrogen and for coupling to a vehicle as a fuel tank, according to an embodiment of the present invention.

Reference is now made to FIG. 1 which is a cross sectional view of a vessel bonded to a porous metal core, adaptable for containing hydrogen and for fastening to a vehicle as a fuel tank. Porous metal core hydride 103 is bonded to vessel 100 to form a hydrogen fuel tank. Porous metal core 103 is produced from mixed metal powder and hydride that are sintered at a high temperature under hydrogen high isostatic pressure, without mechanically exerted stress. The core compacted material after pressing but before heat treatment ("green") can be made by uniaxial compression and by cold isostatic pressure. Alternatively, the core can be produced by rolling of the mixture with or without pressing the powdered mixture between two sheets of metal. Alternatively the core can be produced by a hot isostatic route, when pre-pressed greens are heated at high pressure and high temperature, to obtain sintering of the porous material under a hydrogen containing atmosphere. Preferably, the process could be performed under hydrogen at a pressure above the equilibrium pressure at which the hydrogen is fully absorbed in the solid at the high temperature. This procedure will ensure volumetric stability and long cycle life as particles become encased in the sinter at maximal particle volume.

The hydride mixture can be obtained by mixing of the metal powder with hydride powder in a high energy ("attrition") mill, comminuting and mechanically alloying the particles. Preferable particle size should be under 1 micron, leading into nano-material particles size range ("mechanical alloying"). The mixture can contain additionally, catalyst substances that encourage hydrogen absorption and desorption.

Hydrogen storage nano-materials contain a metal or substance such as complex ion hydride that is capable of forming a hydride by combining with hydrogen. Nano-material contains discrete particles or clusters of particles ("aggregates", "agglomerates") some particles having less than five hundred atoms and a substantial fraction of the substance atoms exposed to the surface.

Nano-materials may be produced by a process of condensing a hydrogen storage material atomized within a thermal or plasma spray, chemical methods as well as rapid solidification. Hydrogen is combined with the hydrogen storage material during the nano-material formation process, or subsequently, to form a hydrogen storing material.

The hydride nano-materials of this invention are produced by a rapid solidification of hydrogen containing metallic alloys like MgH2, LaNi5, as thin strips over a rotating wheel or by releasing the highly pressurized hydrogen containing metal through a small nozzle into a lower pressure compartment to form small particles.

Vessel 100 protects the porous core 103 by accommodating integrity under inside pressure. It may be suitably shaped to be located in a vehicle or elsewhere, to provide space saving. Vessel wall 101 may be made of metal sheathing as aluminum or steel and external strengthening layer as carbon fiber, glass fiber or other composite materials to reduce weight.

A bonding layer 107 is used to bond the internal skin wall to the perimeter of core 103 via furnace brazing or soldering, by using a lower melting alloy than the container skin. This enhances thermal transfer between the vessel 100 and core 103 and provides additional support to contain the inside pressure, whereas reducing weight.

The integral structure obtained by bonding the core to the walls, facilitates lower container weight, since the container walls can be made thinner compared to similar hydride powder containing vessels. The integral structure also allows shaping the container in other than cylindrical and spherical forms, which are usually most efficient for containing pressure and therefore are universally used for high pressure containment.

Internal fins 106, four of which are depicted in FIG. 1, or additional internal or external baffles and fins are incorporated to improve stability and heat transfer capability. Metal wire meshes can also be incorporated to increase heat transfer rates and strength.

Bonding layer 107 also connects to the fins and the baffles placed radialy in direct contact with the skin, further improving thermal transfer and strength. Core 103 is constructed from pre-shaped pellets having pre-bored holes and perforated channels to accommodate an efficient system of channels, which provide a fast trajectory for the released hydrogen.

High flow rate for the hydrogen can also be obtained by preparing sintered compacts as described above, breaking them down into smaller chunks and re-sintering of the mixed chunks. The open spaces between the larger pieces can form passages to allow free flow of the gas, while the contiguous sintered material keeps a certain measure of heat conductivity.

External pipe coil 120 wrapped around vessel 100 and filled with a liquid or coolant is used for heating and/or cooling the hydrogen tank. Heat transfer can be also enhanced by means selected from a group consisting of fins, ventilators, air or water jets, heat pipes.

Micro-porous filter 105 blocks the inlet/outlet aperture to stop particles from flowing outside the container, yet allows released hydrogen to be exhausted through the fastener. O-ring 109 secures the sealing of the container.

Vessel fastener 108 adapted to receptacle 140 is used to lock the container in place when it is mounted container on a vehicle body 130. Four brackets designated by 102 coupled to vessel 100 are used for gripping the vessel by an outside gripper (not shown) to manipulate, extract or insert the vessel, and lock/unlock the fastener. Sensor 110 is utilized to verify safe locking and sealing of fastener 108.

It should be noted that any other method such as a bayonet lock can be used for fast and safe replacement of the container in a vehicle or for static usage.

Sensor 104 representing a temperature sensor, a pressure sensor, or a hydrogen content sensor that can be used to monitor container conditions by a computer or other electronic circuitry for control and safety measures. Such sensor or sensors can be based on thermal, magnetic, optical or on electric properties of the hydrogen containing substance that change according to hydrogen content.

In one embodiment metal mesh or wires may be embedded within the core. The wires can be used for electrical heating of the core to obtain fast hydrogen release or for hydrogen level sensing. Most hydrides have high resistivity and when hydrogen is desorbed, the crystallites become metallic and regain their conductivity. Thus, higher conductivity is an evidence of low hydrogen content. A thermal sensor may be based on thermal response of the hydride in which it is embedded, as hydrogen content changes. Lower content of hydrogen is conducive to high metallic content, therefore increasing local heat conductance.

Figure 2:
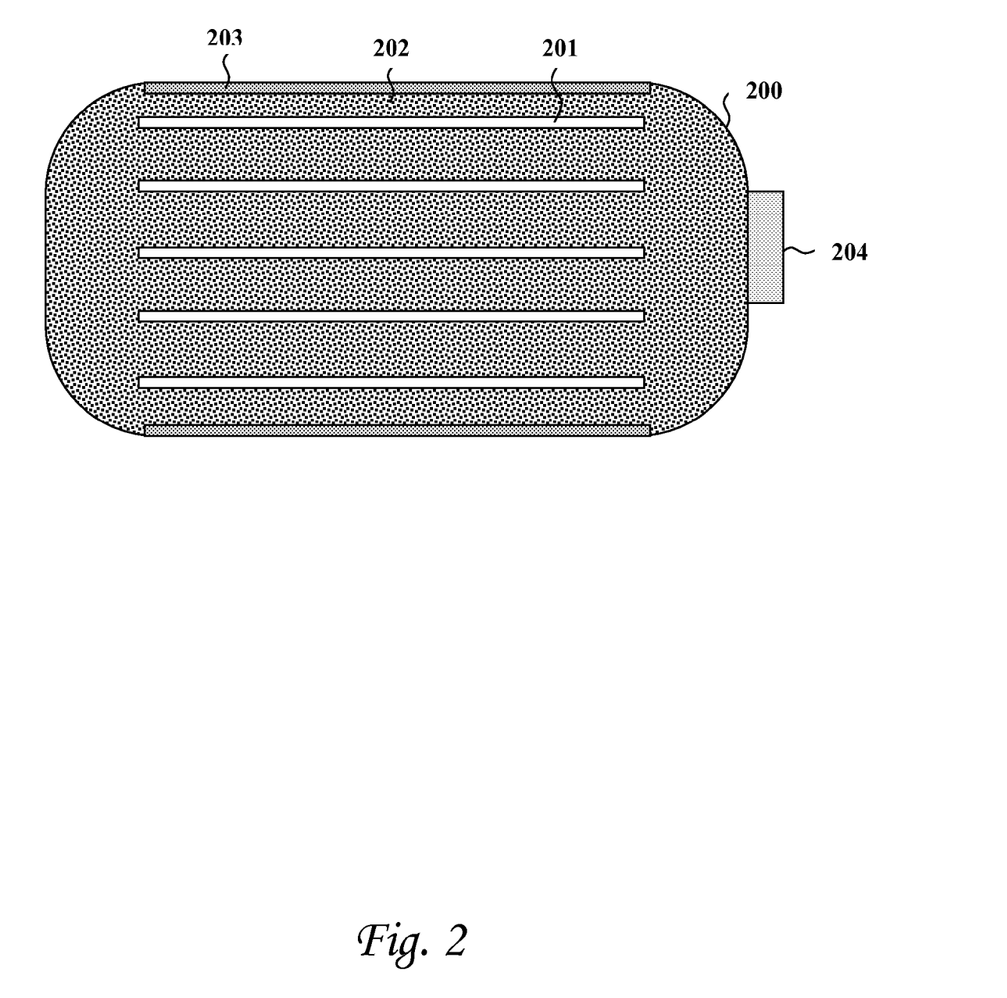
FIG. 2 illustrates a non scaled cross sectional view of a vessel bonded to a porous metal core, containing channels to increase the flow rate of hydrogen into and out of the porous core, according to an embodiment of the present invention.

Reference is now made to FIG. 2 which is a non scaled cross sectional view of hydrogen containing vessel bonded to a porous metal core containing channels to increase the flow-rate of hydrogen into and out of the porous core. Hydrogen flows into and out of the container via inlet/outlet 204. Porous core 202, which is bonded to vessel 200 via bonding layer 203, includes a plurality of straight parallel channels 201 that collect and distribute the hydrogen faster within the core. It should be noted though, that non-straight and non-parallel channels are within the scope of the invention.

Figure 3:
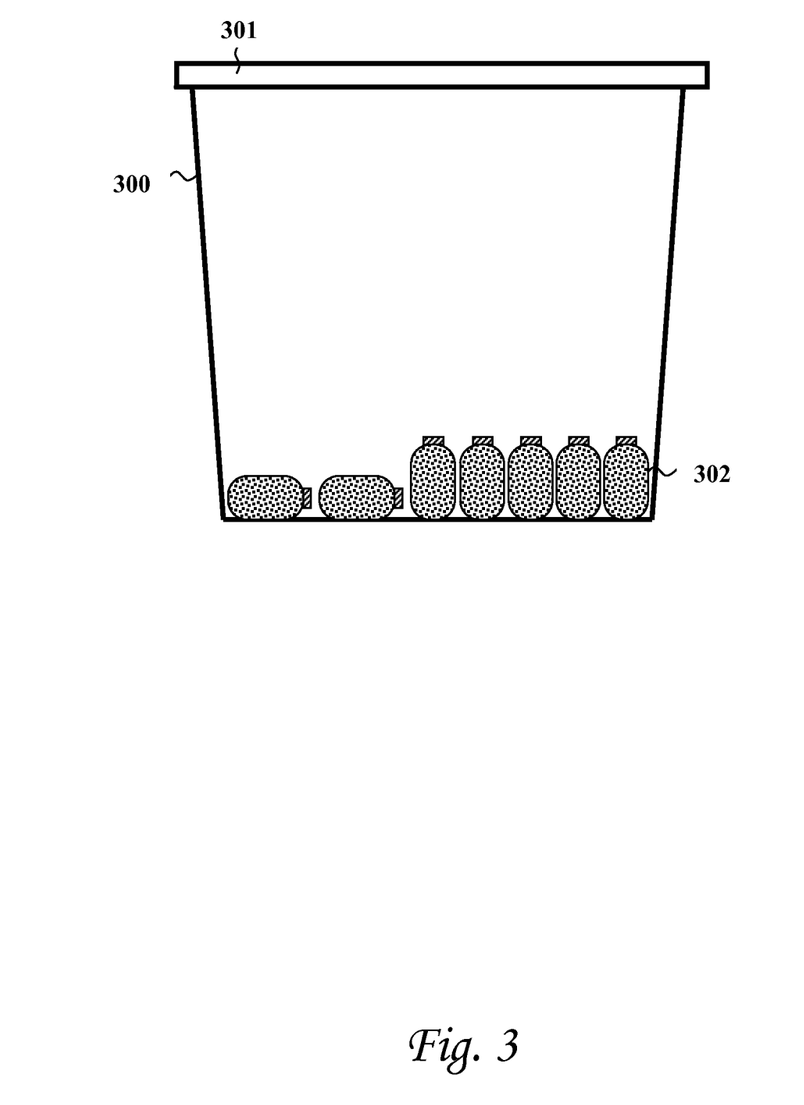
FIG. 3 illustrates a non scaled cross sectional view of a container loaded with a of plurality of hydrogen tanks arranged in a pelletized form, to supply and distribute hydrogen, according to an embodiment of the present invention.

Reference is now made to FIG. 3 which is non scaled cross sectional view of a container loaded with a of plurality of hydrogen tanks in a pelletized form to supply and distribute hydrogen from hydrogen filling stations. Container 300 closed with cover lid 301 includes a plurality of hydrogen storage container 302 which are used to distribute hydrogen. After hydrogen release the empty hydrogen storage container are collected into container 300 and refilled at the filling station. This embodiment allows alleviation of the delivery of hydrogen to filling stations which is regarded as a high difficulty challenge for wide distribution of hydrogen fueled vehicles.

Figure 4:
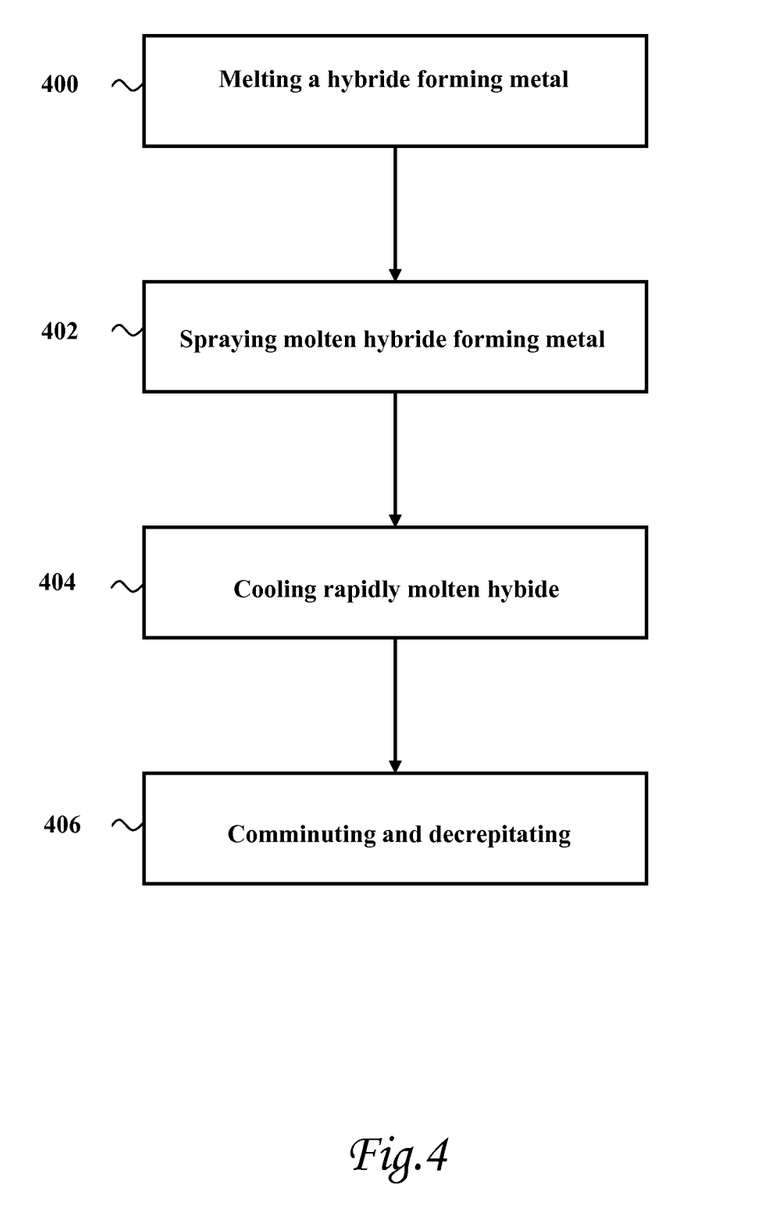
FIG. 4 illustrates a flowchart of a process used for producing a hydride material, according to an embodiment of the present invention

Reference is now made to FIG. 4 which is a flowchart of a process used for producing a hydride material of substantially small grain size. The process begins with melting a hydride forming metal in step 400. The hydride forming substance is a metal such as magnesium, or a complex Ion substance. It can be alloyed with catalyst elements selected from a group consisting of Mm, Ni or Ti. The hydride forming metal is melted in a pressurized and pre-dominantly hydrogen containing atmosphere at elevated temperature, to assure that the hydrogen is dissolved into the molten metal. Spinning molten hydride metal is carried out in step 402. In this step the molten hydride metal is let out of the melting pot onto a metallic copper spinning wheel or alternatively expelled into a low pressure space that is still under high hydrogen content atmosphere. Cooling rapidly molten hydride as in step 404 produces a solidified hydride material of substantially small grain size. Comminuting and decrepitating as in step 406, decreases the hydride grain size under 1 micron.

It will be appreciated that the formerly described methods may be varied in many ways including, changing the order of steps, and/or performing a plurality of steps concurrently.

Figure 5:
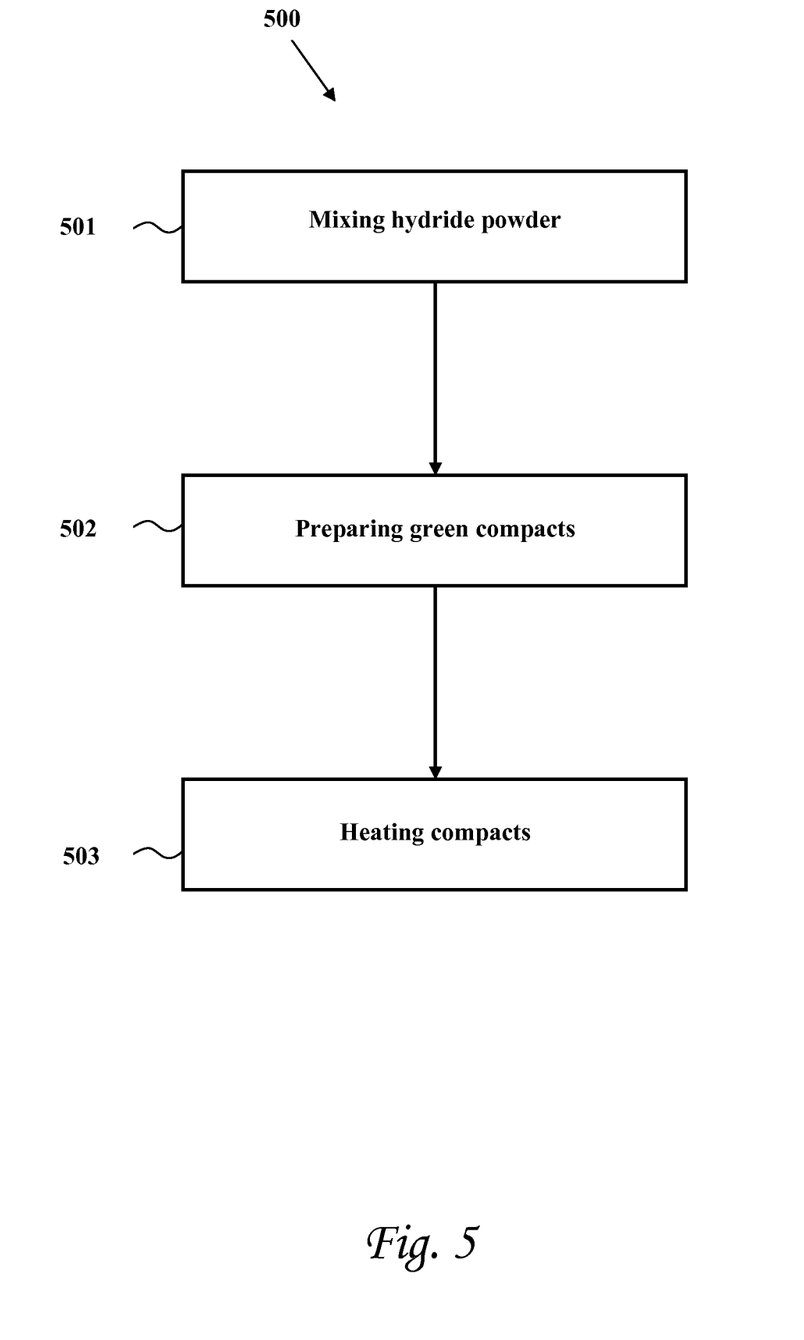
FIG. 5 illustrates a flow chart of a process used to produce metal matrix composites for a hydrogen core, according to an embodiment of the present invention.

Reference is now made to FIG. 5, which is a flow chart of a process used to produce metal matrix composites for a hydrogen core. Process 500 begins with mixing hydride powder with magnesium alloy, magnesium-aluminum alloy or aluminum alloy powder in procedure 501. Procedure 501 is followed by preparing green compacts in procedure 502. The green compacts are prepared by compressing the mixed powder in molds of distinct shape. Heating green compacts in procedure 503 is carried out subsequently. The green compacts are heated to a temperature, which is above the hydride equilibrium temperature under isostatic pressure. This heating continuous until the metal particles merge ("coalesce") to sustain a continuous heat transfer path.

It should also be appreciated that the above described description of methods and apparatus are to be interpreted as including apparatus for carrying out the methods, and methods of using the apparatus, and computer software for implementing the various The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and steps described with respect to one embodiment may be used with other embodiments and that not all embodiments of the invention have all of the features and/or steps shown in a particular figure or described with respect to one of the embodiments. That is, the disclosure should be considered complete from combinatorial point of view, with each embodiment of each element considered disclosed in conjunction with each other embodiment of each element (and indeed in various combinations of compatible implementations of variations in the same element). Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims.

It is noted that some of the above described embodiments may describe the best mode contemplated by the inventors and therefore may include structure, acts or details of structures and acts that may not be essential to the invention and which are described as examples. Structure and acts described herein are replaceable by equivalents performing the same function, even if the structure or acts are different, as known in the art. Therefore, the scope of the invention is limited only by the elements and limitations as used in the claims.

The invention claimed is:

1. A hydrogen container for storing non liquefied hydrogen comprising:
   a metallic closed vessel including at least one aperture; a contiguous porous core of hydrogen bonding material; said core being bonded to said vessel inner wall directly or via a bonding layer;
   wherein said core is produced from mixed metal powder and hydride that are sintered at a high temperature under hydrogen high isostatic pressure.

2. The hydrogen container according to claim 1, wherein said vessel wall is made of metal selected from a group consisting of aluminum, magnesium, their alloys, steel and stainless steel, titanium and titanium alloys.

3. The hydrogen container according to claim 1, wherein a strengthening layer of carbon fiber, glass fiber or other composite materials is added externally to reinforce said vessel wall.

4. The hydrogen container according to claim 1, wherein said core is produced by rolling the mixture between two sheets of metal, before sintering.

5. The hydrogen container according to claim 1, wherein said core contains hydrogen storage nano-material.

6. The hydrogen container according to claim 1 in which the core material contains hydride or nano material hydride and magnesium or magnesium alloy metallic powder.

7. The hydrogen container according to claim 1 wherein fins, baffle plates, liquid containing tubing, heat pipes or other heat transfer enhancing devices are attached to the outside of the container.

8. The hydrogen container according to claim 1 wherein fins, baffle plates, wire mesh, heat pipes, liquid containing pipes or other heat transfer enhancing and strengthening devices are located inside of the container.

9. The hydrogen container according to claim 5, wherein said nano material is produced by rapid solidification of hydrogen containing alloys.

10. The hydrogen container according to claim 5 wherein said nano-material is produced by chemical methods.

11. The hydrogen container according to claim 1, wherein said core is constructed from pre-shaped pellets having pre-bored holes and perforated channels.

12. The hydrogen container according to claim 1, wherein said bonding layer is produced via furnace brazing or soldering, by using a lower melting alloy than the container skin.

13. The hydrogen container according to claim 1, and further comprising internal or external baffles and fins.

14. The hydrogen container according to claim 1, wherein said container includes a temperature sensor, a pressure sensor, or a hydrogen content sensor that can be used to monitor container conditions by electronic circuitry or a computer for control and safety measures.

15. The hydrogen container according to claim 1, wherein said container includes embedding metal mesh or wires for electrical heating of the cores to obtain fast hydrogen release or for hydrogen level sensing.

16. The hydrogen container according to claim 1, wherein a micro-porous filter blocks the aperture to stop particles from flowing outside the container, yet allows released hydrogen to be exhausted.

17. The hydrogen container according to claim 1, wherein external pipe coil wrapped around the container and filled with a liquid or coolants is used for heating or cooling the hydrogen container.

18. The hydrogen container according to claim 1, wherein brackets coupled to said container are used for gripping by an outside gripper to manipulate, extract or insert the vessel, therefore allowing its use as a refillable cartridge.

19. The hydrogen container according to claim 1, wherein said container includes a fastener that is used to lock the container in place when it is mounted container on a vehicle body.

20. The hydrogen container according to claim 19, wherein a sensor is utilized to verify safe locking and sealing of said fastener.

21. The hydrogen container according to claim 1, wherein a plurality of said hydrogen container are loaded in a pelletized form into an external container to distribute and supply hydrogen.

* * * * *